July 6, 1965     B. LEIBINGER     3,192,835

BEVELING TOOL

Filed Aug. 20, 1963     2 Sheets-Sheet 1

INVENTOR.
BERTHOLD LEIBINGER
BY
McGrew & Toren
ATTORNEYS.

July 6, 1965  B. LEIBINGER  3,192,835
BEVELING TOOL

Filed Aug. 20, 1963  2 Sheets-Sheet 2

INVENTOR.
BERTHOLD LEIBINGER
BY
McGlew & Toren
ATTORNEYS.

United States Patent Office 3,192,835
Patented July 6, 1965

3,192,835
BEVELING TOOL
Berthold Leibinger, Stuttgart-Weilimdorf, Germany, assignor to Firma Trumpf & Co., Stuttgart-Weilimdorf, Germany
Filed Aug. 20, 1963, Ser. No. 303,234
Claims priority, application Germany, Jan. 15, 1963,
T 23,330
18 Claims. (Cl. 90—24)

This invention relates in general to forming tools, and in particular to a new and useful device for beveling workpieces which includes simple means for supporting a workpiece at an inclination in respect to a reciprocable bit.

The present invention has particular application for beveling workpieces which are to be welded. Depending on the welding procedure which is to be employed, joint shapes between plates which are to be welded together are made of different types. Z- and X-like joints are particularly employed. Before welding the edges of the workpieces to be joined have to be prepared, and this is usually done by circle cutting machine, planing tools, or various cutters and burning cutting machines. Circle cutting machines have the disadvantage that a separate cutting wheel has to be employed for different workpiece thicknesses and for different qualities of workpieces which are cut.

In addition, such machines can only produce a predetermined angle of inclination of the edges and use of such machines presupposes that the workpiece is above the minimum width. In addition, such machines are extremely expensive and, due to their heavy weight, have to be stationary and cannot be portable.

Planing tools only produce straight line edges and tools of this nature have the further disadvantage that they are very expensive. The various cutters which have been employed for preparing billets for welding are not very advantageous because it is very expensive to work with very large workpieces, and in some instances it is impossible from a practical point of view.

In some instances workpieces are prepared by burning cutting tools so as to smooth out the edges prior to the welding. Burning cutting devices are expensive to operate. In addition, it is difficult to guide the burners along curved areas and only curves of very shallow bends can be produced. A further disadvantage is that the cutting edge which is formed is not cleaned, but is usually burned and oxidized. In addition, it also causes metallurgical changes in the structure of the metal which negatively effects the subsequent welding. Therefore, when the edges are prepared by burning cutting, it is often necessary to subsequently clean the edges or subject them to an after-treatment.

In accordance with the invention, there is provided a simple, inexpensive hand tool for beveling or inclining metal edges which are to be welded thereafter. In a preferred arrangement the hand tool includes a reciprocating plunger carrying a steel bit. The tool also comprises a base plate or supporting plate for the workpiece and, in accordance with the invention, the steel bit is arranged obliquely to the guide surface of the supporting plate, and opposite to the guide surface there is provided a device for holding down the workpiece on the guide surface. The tool can be manually applied to the workpiece and with the device it is possible to produce edges for the usual Z and X welding joints. Exterior curves, or bend areas, of any desired radius and interior curved areas of exceedingly small radius can be produced.

It is also possible, particularly in working small workpieces, to mount the workpiece in a stationary manner; for example, on a chuck or a vice. No lubrication of the cutting lines is necessary and this is very advantageous due to the subsequent welding which is to be carried out since the lubricant may have disadvantageous effects on the metal. The finished beveled edges of the workpiece will, thus, be metallically clean and shiny and an excellent surface characteristic is obtained. Workpieces which are handled by such a tool can be immediately welded and no intermediate or after-treatment is necessary.

In accordance with another feature of the invention, the supporting plates of the workpiece and a counter holder with means for holding down the workpiece on a supporting plate are arranged in a stirrup which is detachably secured at the driving head of the tool. The stirrup can thus be exchanged without difficulty for substitution with a new stirrup for handling a different size workpiece, for example. In addition, it is possible to exchange the stirrup elements to make it possible to produce a different edge angle on the workpiece. It is possible, thus, to produce any suitable edge angle merely by replacing the stirrup with the tool elements. In order to facilitate the exchange of the stirrup, the stirrup has a thread which is screwed into the drive head.

In accordance with another embodiment of the invention, the supporting plate is rockably mounted at the stirrup in relation to its angular position relative to the steel bit so that the angle of beveling may be varied without exchanging the stirrup. With such a construction, a supporting plate can be secured in any angular position in respect to the stirrup. When a change of edge angle is to be effected, then the supporting plate is merely rocked to the desired angular position and fixed in this position by a clamping bolt. The construction is such that the supporting plate, counter holder and holding down means are mounted to be rocked on the stirrup in this manner.

In order to permit adjustment of the device to the different thicknesses of the workpiece or to the different levels and edges, the invention includes a further feature. The supporting plate, the counter holder and the holding down means are releasably secured to the stirrup or by means of a screw connection to facilitate easy removal and substitution by a supporting plate of a different thickness. In the same manner the counter holder and the holding down means can be adjusted to the respective workpiece shapes.

In accordance with a further feature, the supporting plate, the counter holder and the holding down means are individually adjustable relative to the workpiece and to their guiding surfaces. With such a construction it is not necessary to exchange these various elements to accommodate various thicknesses of workpieces.

In order to obtain a predetermined feed length upon each stroke of the tool, there is preferably provided a laterally arranged abutment at the tool to limit the amount of feed. This abutment may advantageously be provided either at the steel bit or held stationarily at the stirrup or the mounting means. Advantageously, the abutment is detachably arranged so as to permit its removal, should it be required. Particular advantages are obtained if at both sides of the tool there are provided securing devices for the abutment. If this is so, then it is possible to work with the tool in both directions while the abutment is merely secured on that side of the tool which is opposite to the working direction.

Accordingly, it is an object of this invention to provide an improved tool for beveling workpieces.

A further object of the invention is to provide a device for forming bevels on workpieces which includes a mounting head carrying a reciprocable cutting bit and which further includes a supporting plate for the workpiece disposed obliquely to the cutting bit for positioning the workpiece in an inclined manner in relation thereto.

A further object of the invention is to provide a tool for forming bevels on workpieces which includes a tool head in which is reciprocable a cutting bit, and with a stirrup portion held by the head alongside the cutting bit which carries a workpiece supporting plate and counter holder arranged for clamping a workpiece at an angle in respect to the cutting bit for effecting a beveling of an edge thereof, and including means for adjustably positioning these elements in respect to the cutting bit.

A further object of the invention is to provide a tool for beveling a workpiece which includes a head element having a stirrup portion arranged adjacent a reciprocable cutting bit to which is removably secured a supporting plate for a workpiece, and which further carries a counter holder which is adjustably positioned in relation to the supporting plate, and which, additionally, carries a holding down means for positioning the end of the workpiece in relation to the cutting bit which, in turn, is further adjustably positionable.

A further object of the invention is to provide a tool for beveling workpieces which includes guide means for regulating the feed of the cutting tool for the beveling of the edge thereof, and which further includes a pivotally mounted mounting assembly for the workpiece comprising a supporting plate and counter holding means.

A further object of the invention is to provide a tool for forming workpieces which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
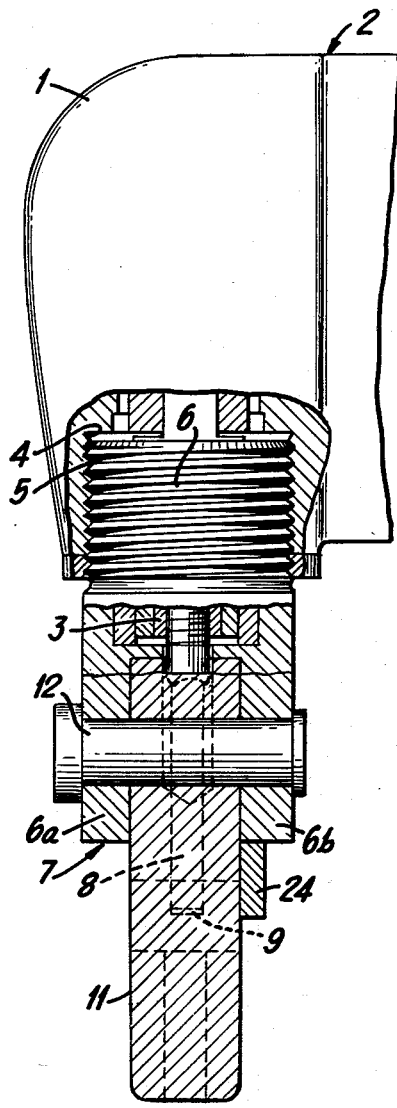
FIG. 1 is a partial rear elevational and transverse sectional view of a beveling tool constructed in accordance with the invention and taken on the line 1—1 of FIG. 2.
Figure 2:
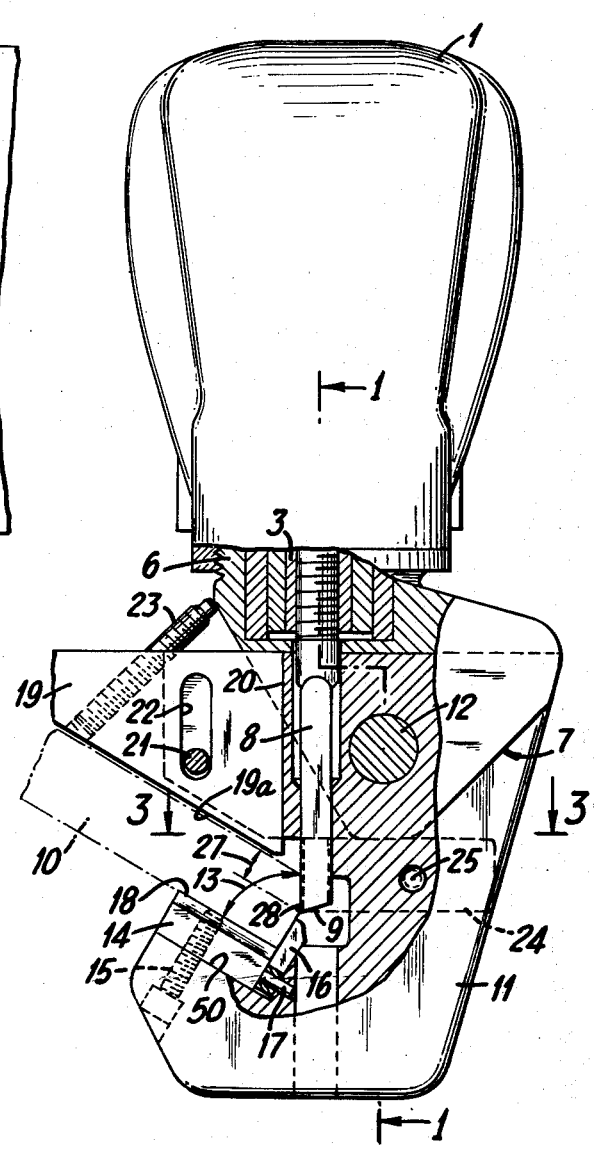
FIG. 2 is a partial side elevational and partial sectional view of the beveling tool indicated in FIG. 1.

Referring to the drawings in particular, the invention embodied therein in FIGS. 1 to 4 includes a drive head 1 of the tool generally designated 2, which carries an electric drive motor (not shown). In the drive head 1 there is arranged a reciprocable plunger or ram 3 which is reciprocated in a known manner by an eccentric (not shown) which is driven by the electric motor. The drive head 1 has a recess 4 in the lower portion provided with an interior thread, which is engaged by an exterior thread 5 of an upper portion 6 of a stirrup member generally designated 7. The stirrup member 7 is generally C-shaped in profile and is provided with a bore at its upper end to accommodate a reciprocable ram or plunger 3. A steel bit, or cutting tool 8, which has an inclined or cutting surface 9 is carried by the ram 3 for reciprocation therewith. The inclined surface 9 insures secure engagement of the cutting tool 8 with a workpiece 10, indicated in dotted lines as positioned in the tool (FIG. 2).

The stirrup 7 includes the upper stirrup portion 6 which is bifurcated and which holds a lower stirrup portion 11 between side arms 6a and 6b. The lower portion is supported by means of a releasable bolt 12 carried in the side arms 6a and 6b. The lower portion 11 includes an inclined inner top edge 50 arranged obliquely to the axis of the bit 8 for supporting a supporting plate or work piece supporting means 14 thereon, which is secured in position by means of a screw 15. In the embodiment illustrated, the supporting plate 14 is arranged at an angle indicated by the numeral 13, which angle is about 60° from the longitudinal axis of the steel bit 8.

The workpiece 10 is positioned over the supporting plate 14, as indicated, and the supporting plate 14 provides a guide surface 18 therefor. Above the workpiece and held by the upper portion 6, there is arranged a holding down means comprising a plate 19 with an oblique surface 19a which rests on the workpiece. The lower stirrup portion 11 is provided with a slot 20 to accommodate the holding down means, and a bolt 21 extends through a slot 22 of the holding down means and into walls of the lower portion 11 which surround the slot 20. The positioning of the holding down means or plate 19 is set by means of a screw 23 which is carried thereby and which includes a displaceable threaded portion which may be adjusted to bear against the upper stirrup portion 6.

Figure 3:
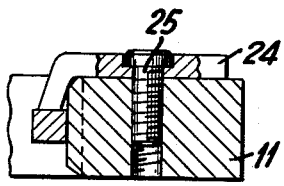
FIG. 3 is a section taken on the line 3—3 of FIG. 2.
Figure 4:
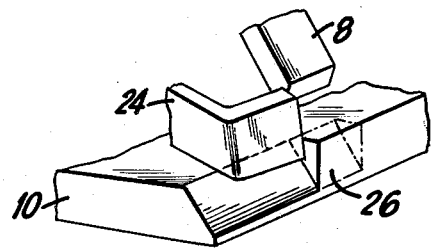
FIG. 4 is a somewhat schematic perspective elevation of the parts indicated in FIG. 3; and, FIG. 5 is a partial side elevational and sectional view of another embodiment of the beveling tool.

In FIGS. 3 and 4 there is illustrated the arrangement of an abutment member or guide element 24 which is substantially L-shaped and which is secured to a side of the lower portion 11 and extends around an end thereof for limiting the feed or advance of the bit 8. The abutment 24 is releasably secured at the lower stirrup portion 11 by means of a screw 25. As indicated in FIG. 3, the abutment 24 can be selectively secured on either side of the lower stirrup portion 11 so that the tool can be worked in either direction.

In order to bevel or incline the edges of the workpiece 10, the latter is positioned, as indicated in dot and dash lines in FIG. 2, and is inserted between the U-shaped guide which is formed by the supporting plate 14, the counter holder 16 arranged at the end of the supporting plate 14, and the holding down means 19. The counter holder 16 may be adjusted by means of a threaded member 17 which threads into the supporting plate 14. Upon each reciprocating stroke of the steel bit 8, a metal piece 26 is separated. The width of the metal piece corresponds to the width of the steel bit. The tool is then advanced to reposition the feed limiting means 24 and the next stroke is effected.

In order to obtain a different beveling angle, either the supporting plate 14, or the lower stirrup portion 11, or the entire stirrup 7 may be exchanged. By making supporting plate 14 of different height, it is possible to replace a supporting plate for accommodating workpieces of various thicknesses. In addition, the web height, indicated by the numeral 27, of the edge 28 which is cut away can be changed in this manner.

Figure 5:
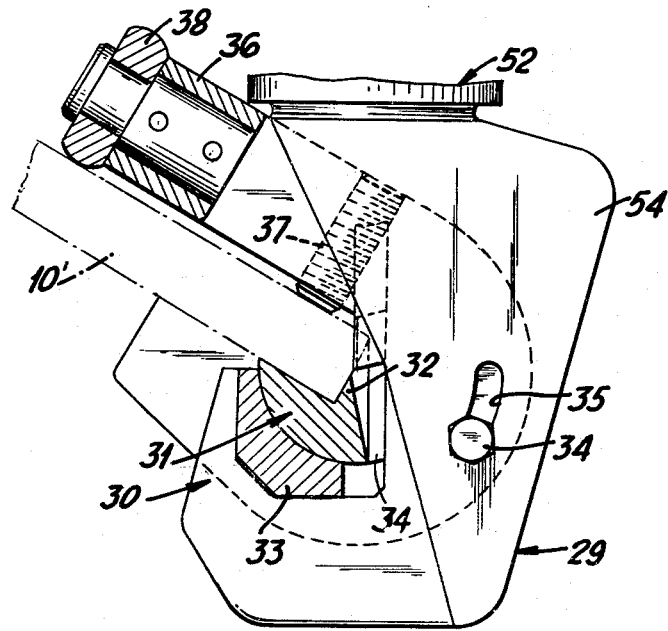

In the embodiment of FIG. 5 there is indicated a tool generally designated 52 which has a head portion (not shown) similar to the other embodiment and which includes a stirrup generally designated 29 of somewhat modified form. The stirrup includes an upper portion 54 which is forked and carries within its fork arm portions a rockable mounting assembly generally designated 30. The mounting 30 is rotatable within the forked portions of the stirrup portion 54, and within the mounting there is arranged a combination supporting plate and counter holder 31. The combination supporting plate and counter holder includes a counter holder portion 32 which compares to the counter holder 16 of the other embodiment. The combination supporting plate and counter holder 31 is additionally supported in a special bearing disc 33 which is provided with a curved surface which rockably supports the combination supporting plate and counter holder 31, 32.

A screw bolt 34 which extends through the mount 30 is guided in a slot 35 of the stirrup portion 54. The screw bolt 34 may be tightened in order to fix the mounting 30 in the setting which is selected.

The mounting means 30 also has a holding down means 36 which bears downwardly on a workpiece 10' positioned on the combination supporting table and counter holder 31. The holding down piece 36 contacts the workpiece 10' through an adjustable screw bolt 37 at one end by means of a knob 38 at an opposite end. When the beveling angle is to be changed, then the mounting 30 may be rotated relatively to the stirrup portion 54. The bolt 37 may be adjusted for thickness variations of the workpieces.

While specific embodiments of the invention have been shown and described in detail to illustrate the application of the inventive principles, it will be understood that the invention may be embodied otherwise without departing from such principles.

What is claimed is:

1. A portable tool for beveling the edges of workpieces, comprising; a head, a cutting tool reciprocable in said head, a stirrup supported by said head and having a supporting plate for the workpiece arranged at an angle in respect to said reciprocable cutting tool, counter holder means on said stirrup extending at an angle to said supporting plate and forming an abutment for locating the end of the workpiece adjacent the reciprocating cutting member, and holding down means carried adjacent the upper portion of said stirrup adapted to overlie the workpiece positioned on said supporting plate means.

2. A portable beveling tool according to claim 1, wherein said supporting plate means, counter holder means and holding down means are arranged on said stirrup, said stirrup being detachably secured to said head.

3. A portable beveling tool according to claim 1, wherein said stirrup is threaded to said head.

4. A portable beveling tool according to claim 1, wherein at least said supporting plate is mounted on said stirrup in a rockable and settable manner.

5. A tool for beveling metal edges, comprising a stirrup member having a hollowed out portion, a cutting member reciprocable within the hollowed out portion of said stirrup member, said stirup member having a pivotal portion with a surface disposed at an angle to the axis of reciprocation of said cutting member for supporting a workpiece supporting plate, a workpiece supporting plate positioned on the supporting surface and connected to said stirrup, a counter holder adjacent the inner end of said workpiece support plate for positioning an edge of the workpiece adjacent the reciprocable cutting member, and holding down means carried by said stirrup at a fixable location to overlie the workpiece positioned on the supporting plate, the pivotal portion of said stirrup being pivotal toward said holding down means for clamping a workpiece between said holding down means and said workpiece support plate.

6. A beveling tool according to claim 5, including a head, said stirrup being connected to said head.

7. A beveling tool according to claim 5, wherein said stirrup is substantially C-shaped, said oblique surface for said supporting plate being located at the lower portion thereof.

8. A device according to claim 5, wherein said stirrup includes an upper forked portion, and a lower portion held within the upper forked portion.

9. A beveling tool according to claim 5, wherein said stirrup is forked, and a mounting assembly rotatably supported within the forked portion of said stirrup and including a combination supporting plate and counter holder for the workpiece and said holding down means.

10. A beveling tool according to claim 1, wherein said counter holder in said workpiece supporting plate comprises a single element having a surface for accommodating the lower portion of the workpiece and an end surface disposed at an angle therefrom for positioning the end of said workpiece in alignment with said cutting member.

11. A portable beveling tool comprising a head, a stirrup member connected to said head, said head and said stirrup member having a bore for accommodating a reciprocable cutting member, a cutting member reciprocable in the bores of said stirrup member and said head, said stirrup member being substantially C-shaped and including an upper portion and a lower portion pivotal on said upper portion, supporting plate and counter holder means positioned on the lower portion of said stirrup for locating the bottom and edge of a workpiece to be operated upon by said cutting tool, and holding down means carried by said stirrup above the workpiece supporting plate and counter holder means for holding the opposite side of the workpiece.

12. A beveling tool according to claim 11, wherein said workpiece supporting plate and said counter holding means comprises a single element having intersecting surfaces disposed at an angle in respect to each other for positioning the bottom and edge of the workpiece, respectively.

13. A beveling tool according to claim 11, wherein said workpiece supporting plate means and counter holder includes a plate element connected to said stirrup and a separate counter holder element adjustably connected to said stirrup.

14. A beveling tool comprising a head portion, a stirrup connected to said head portion of substantially C-shaped configuration and with a lower portion pivotal in respect to an upper portion, the lower portion having a lower edge inclined for carrying a supporting plate for a workpiece, a supporting plate for a workpiece on said lower edge and adjustably connected to said stirrup member, a counter holder adjustably connected adjacent said supporting plate member for limiting the edge position of the workpiece, a cutting member reciprocable within said stirrup member at a location above said counter holder and said supporting plate, and means carried by said stirrup for holding the workpiece down on said supporting plate.

15. A beveling tool comprising a head, a stirrup adapted to be connected to said head, being forked and having leg portions, a mounting assembly carried between said leg portions, said mounting assembly comprising a combination supporting plate and counter holder rotatable in said stirrup, and holding down means for contacting a workpiece on the opposite side from said supporting plate and counter holder member.

16. A tool for beveling the edges of workpieces, comprising: a head, a cutting tool reciprocable in said head, a stirrup supported by said head and having a supporting plate for the workpiece arranged obliquely in respect to said reciprocable cutting tool, counter holder means on said stirrup for locating the end of the workpiece adjacent the reciprocating cutting member, holding down means carried adjacent the upper portion of said stirrup adapted to overlie the workpiece positioned on said supporting plate means, and mounting means rotatable on said stirrup, said mounting means having said counter holder means and said holding down means.

17. A tool for beveling the edges of workpieces, comprising: a head, a cutting tool reciprocable in said head, a stirrup supported by said head and having a supporting plate for the workpiece arranged obliquely in respect to said reciprocable cutting tool, counter holder means on said stirrup for locating the end of the workpiece adjacent the reciprocating cutting member, holding down means carried adjacent the upper portion of said stirrup adapted to overlie the workpiece positioned on said supporting plate means, means rotatable on said stirrup, said mounting means having said counter holder means and said holding down means, said counter holder means, holding down means and supporting plate means being detachably connected to said stirrup.

18. A tool for beveling metal edges, comprising a stirrup member having a hollowed out portion, a cutting member reciprocable within the hollowed out portion of said stirrup member, said stirrup member having an oblique surface for supporting a workpiece supporting plate, a workpiece supporting plate positioned on the oblique surface and connected to said stirrup, a counter holder adjacent the inner end of said workpiece support plate for positioning an edge of the workpiece adjacent the reciprocable cutting member, and holding down means carried by said stirrup at a location to overlie the workpiece positioned on the supporting plate, said holding down means including a plate member having a slot, said stirrup including a bolt extending through said slot for guiding said plate member in respect to the workpiece and a set screw for fixing said plate member in relation to said workpiece.

References Cited by the Examiner

UNITED STATES PATENTS 2,888,744  6/59  Yermish _____ 83—916 X

FOREIGN PATENTS 312,800  6/19  Germany.
545,742  3/32  Germany.
165,065  10/58  Sweden.

WILLIAM W. DYER, Jr., *Primary Examiner.*